(No Model.) 3 Sheets—Sheet 1.
J. G. CARLINET.
SCULPTURING APPARATUS.
No. 361,131. Patented Apr. 12, 1887.
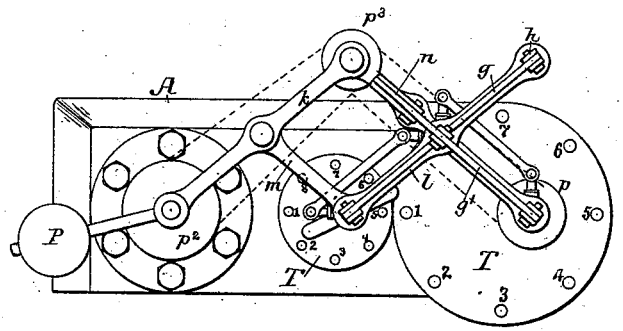
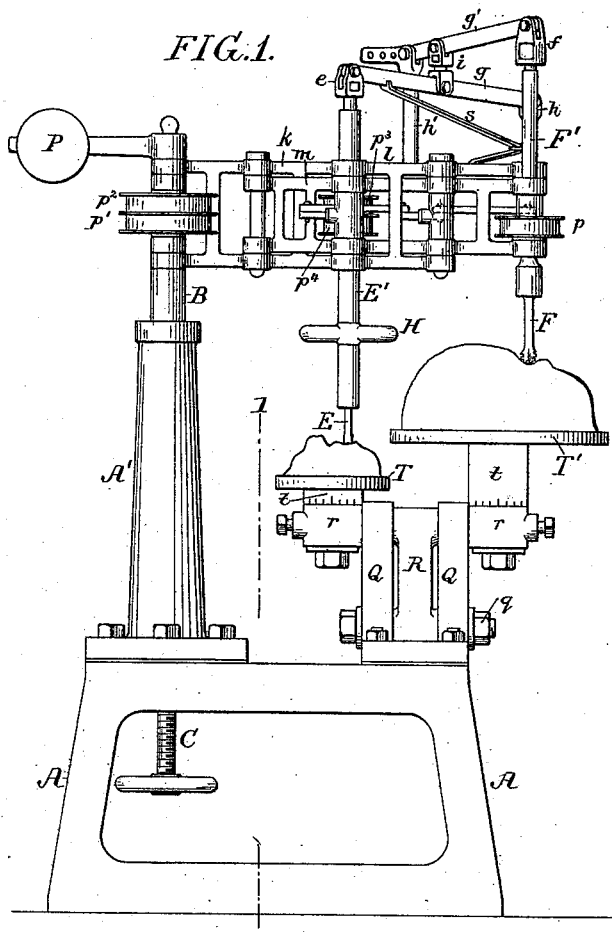
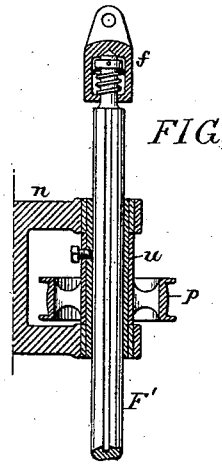
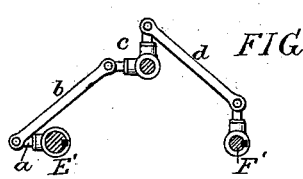
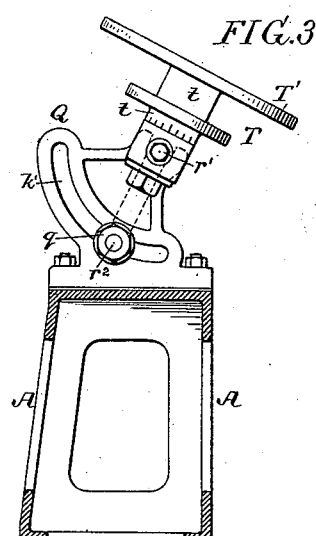
Witnesses:
David L. Williams
William D. Conner
Inventor:
John G. Carlinet
by his Attys.
Howson & Sons (No Model.) 3 Sheets—Sheet 2.
J. G. CARLINET.
SCULPTURING APPARATUS.
No. 361,131. Patented Apr. 12, 1887.
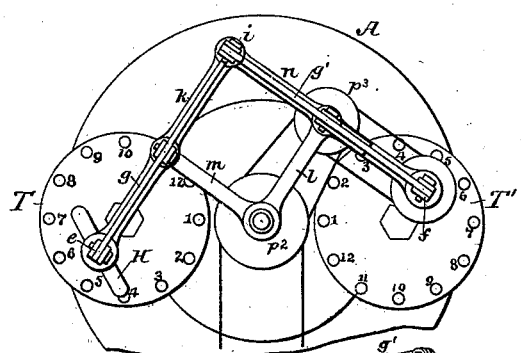
Witnesses:
David S. Williams
William D. Conner
Inventor:
John G. Carlinet
by his Attys.
Howson & Sons (No Model.) 3 Sheets—Sheet 3.

J. G. CARLINET.
SCULPTURING APPARATUS.

No. 361,131. Patented Apr. 12, 1887.

Witnesses:
David S. Williams
William D. Conner

Inventor:
John G. Carlinet
by his Attys,
Howson & Sons

UNITED STATES PATENT OFFICE.

JOHN G. CARLINET, OF PHILADELPHIA, PENNSYLVANIA.

SCULPTURING APPARATUS.

SPECIFICATION forming part of Letters Patent No. 361,131, dated April 12, 1887.

Application filed February 12, 1887. Serial No. 227,459. (No model.)

*To all whom it may concern:*

Be it known that I, JOHN G. CARLINET, a subject of the King of Italy, and a resident of Philadelphia, Pennsylvania, have invented certain Improvements in Sculpturing Apparatus, of which the following is a specification.

My invention consists of certain improvements in that class of machines which operate, on the principle of the pantograph, for sculpturing, modeling, engraving, or otherwise reproducing any given model on a larger, smaller, or equal scale, and in any desired material.

The main object of my invention is to so construct the machine as to obtain a more complete control of the movement of the tools, and to be able, when desired, to produce a relief—for instance, from a bust or similar full shape.

Figure 10:
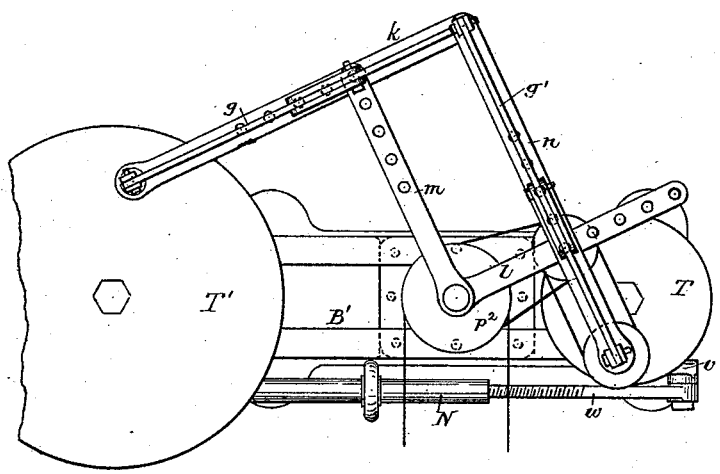
Figure 9:
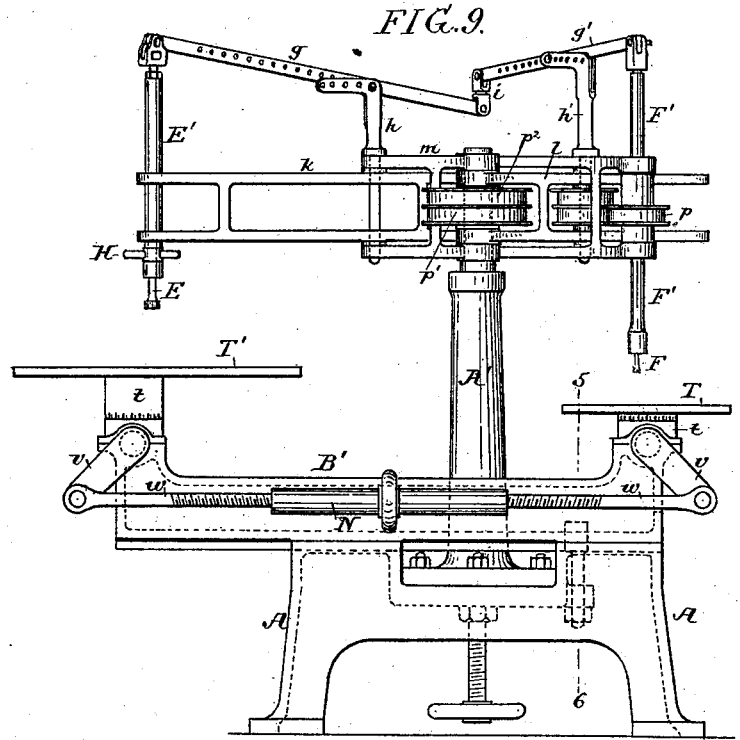
Figure 11:
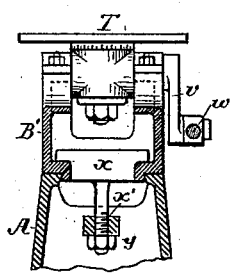

In the accompanying drawings, Figure 1 is a side view of one form of my improved sculpturing-machine. Fig. 2 is a plan view. Fig. 3 is a vertical section on the line 1 2, Fig. 1. Fig. 4 is a sectional view, drawn to an enlarged scale, of a portion of the machine. Fig. 5 is a detached plan view illustrating a detail. Fig. 6 is a side view, partly in section, of a modified form of my improved machine. Fig. 7 is a corresponding plan view. Fig. 8 is a sectional plan view on the line 3 4, Fig. 6. Fig. 9 is a side view of another modified form of my machine. Fig. 10 is a plan view of the same. Fig. 11 is a sectional view on the line 5 6, Fig. 9. Fig. 12 is an enlarged sectional view of a detail. Fig. 13 is a detached view of a swivel which may be used in connecting certain of the levers. Figs. 14 and 15 are views of the cutting-tool which may be employed in carving or modeling with my machine.

The machine shown in Figs. 1, 2, and 3 is constructed for the reproduction of objects on a different scale from the model, one-half or double size, but adjustable to vary the relief in the reproduction in relation to that of the model.

The machine shown in Figs. 6, 7, and 8 is constructed for the reproduction of objects on the same scale, but also adjustable to vary the relief in the reproduction relative to that in the model.

The machine shown in Figs. 9, 10, and 11 is adjustable for the reproduction of objects on a greater, smaller, or equal scale, as will be hereinafter more fully set forth.

Referring to the construction illustrated in Figs. 1, 2, 3, and 4, A is the bed-plate of the machine, on which is mounted an upright column, A', and to bearings in this upright column is adapted a vertical spindle, B, which can be adjusted vertically in the column by means of a screw-spindle, C. (See also Fig. 6.) The upper end of this spindle B carries the pantograph levers or brackets $k$ $l$ $m$ $n$. The guide-tool E, which is to be passed over the face of the model, is carried by a spindle, E', which passes through the pivoting center of the levers $l$ and $m$ of the pantograph, while the sculpturing, carving, or modeling tool F, which operates on the material in which the model is to be reproduced, is carried by a spindle, F', passing through a sleeve in an extension of the lever $n$ of the pantograph. By the movement of the pantograph-levers the necessary horizontal movement can be given to the tools, as in other sculpturing-machines operating on this principle.

In the machine shown in Figs. 1 and 2 the carving-tool F is shown as arranged to have a movement just double that of the movement of the guide-tool E; but it will be understood that this may be reversed by simply changing the tool F to the spindle E' and the tool E to the spindle F'. To impart a rotary motion to the carving-tool, a pulley, $p$, on the sleeve which carries the tool-spindle, is provided, in connection with pulleys $p'$ $p^2$ $p^3$ $p^4$, at proper points on the pantograph-levers, as will be readily understood on reference to Figs. 1 and 2. A counter-weight, P, is provided to balance the pantograph-levers and tools. In order to get a further control over the movement of the tools, however, than is furnished by the movement of the pantograph-levers themselves, I construct the tool-carrying spindles E' F' so that they can slide vertically in their bearings in the pantograph levers or brackets, and their upper ends are connected by levers, so that the vertical movement of the guide-tool E will be followed by a corresponding proportionate movement of the cutting or modeling tool F, and the extent of this proportionate movement will vary according to the pivoting-points of the connecting-levers. In the present instance the vertical movement of the spindle F' will be twice that of the spindle E', so that the reproduction of the model will be in every direction just double the size of the model itself.

As illustrated in Fig. 2, the upper end of the tool-spindle E' is pivoted by a suitable swivel, e, to a lever, g, whose outer end is pivoted to a standard, h, on an extension of the bracket l of the pantograph. The carving or modeling tool spindle F' is pivoted through a suitable swivel, f, to a lever, g', whose other end is pivoted to an upright, h', on the bracket h of the pantograph. The levers g and g' are connected to each other by means of swivel-stirrups i, Fig. 10, and a spring, s, pressing on the lever g, tends to keep the levers raised against the pressure of the hand of the operator upon the handle H of the tool-spindle E'.

The model to be copied and the material in which the copy is to be made are carried by suitable tables, T T', having vertical stems t, adapted to sockets r on the adjustable bracket R. This bracket is pivoted at r' to segments Q, carried by the bed-plate of the machine. These segments have curved slots k', through which pins or bolts r² on the bracket R project, and these pins or bolts are provided with nuts q, by means of which the bracket, with its tables, can be secured to any suitable angle, according to the contour of the model being operated on. The shoulders on the stems of the tables T T' may be provided with suitable graduation-marks, whereby the proper relative rotary adjustment of the two tables T and T' may be insured. The tables themselves may be provided with holes 1 2 3, &c., as illustrated in Fig. 2, for the reception of suitable clamps, and these holes are numbered, in order to further facilitate the correct rotary adjustment of the tables.

In order to be able to vary the relative vertical movements of the two tools, the pivoting-post h' of the lever g' may be provided with a horizontal arm, as shown in Fig. 1, having holes through any of which the pivoting-pin may be passed, so that when desired the vertical movement of the carving or modeling tool in proportion to the movement of the guide-tool E may be increased or diminished without varying the proportionate horizontal movement due to the pantograph-levers. By this means the model of a full bust on the table T' may be reproduced in the form of a relief on the table T by maintaining the relative horizontal movement of the tools due to the pantograph-levers, while greatly reducing the proportional vertical movement of the carving or modeling tool to that of the guide-tool.

In working soft material, where it is not necessary to give a rotary cutting movement to the tool, the pulleys p p', &c., may be dispensed with, and in that case it may be desirable to control the position of the modeling-tool in a rotary direction from the spindle of the guide-tool E. For this purpose the arrangement of levers a b c d, illustrated in Fig. 5, may be employed, so that a partial rotary movement of the spindle carrying the guide-tool by hand of the operator will correspondingly turn the carving-tool E.

Where the driving-pulley is used to impart a rotary cutting motion to the sculpturing-tool, it is desirable to avoid any side pressure upon the tool-spindle by the action of the driving-belt, and for this purpose the sleeve u, which carries the driving-pulley, is itself adapted to bearings in the bracket n of the pantograph, and the tool-spindle F' can slide vertically through the sleeve, which is connected, however, by a feather to the spindle, so that the latter must rotate with the sleeve, as illustrated in Fig. 4.

To provide for the vertical adjustment of the guide-tool E where desired, I prefer to make the tool-spindle E' hollow, as illustrated in Fig. 12, and thread a bolt, e', into the upper end of it, to which the pivoting-swivel e is connected.

The carving or modeling tool may be of any desired form; but that illustrated in Figs. 14 and 15 is preferred.

In the modification illustrated in Figs. 6, 7, and 8 the construction does not differ materially from that already described, except that the tables which carry the material and the tools and tool-spindles are on opposite sides of the supporting-column, and the parts are shown as arranged for the reproduction of the model on the same size as the model itself. The two tables T T' in this machine are mounted in sockets r³, pivoted horizontally in the bed-plate of the machine, and a journal of each socket carries at one end a crank, v. To the end of each crank is pivoted a threaded bolt, w, and the two threaded bolts are screwed into the opposite ends of a sleeve or connecting-swivel, N, having corresponding right and left handed threads. This sleeve is provided with a suitable hand-wheel, by turning which the tables T T' may be tilted to the proper angle required by the contour of the model to be copied.

In the machine shown in Figs. 9, 10, and 11 the relative movements of the tools can be varied horizontally as well as vertically, so that the relative sizes of the model and the reproduction may be varied to any extent within the capacity of the machine.

As before described with reference to the machine shown in Figs. 1 and 6, the pivoting-points of the levers g and g' may be adjusted to vary the relative vertical movements of the tool-carriers E' and F'. The horizontal adjustment is provided for by the adjustability of the connection of the pantograph-levers to each other, as shown in Fig. 10, these levers being provided with a series of holes at different points along the lever for the reception of the connecting pivot-pins, as will be readily understood. This requires the provision also for a proper adjustment of the tables T T', carrying the model and material operated on.

I make the tables adjustable, not with reference to each other, but with reference to the supporting-center of the pantograph-levers. For this purpose the tables T and T' are mounted on a common carriage, B', which is movable transversely on horizontal slides on the bed of the machine, and the carriage can be secured in any position to which it has been adjusted by means of a suitable clamp—such as illustrated in Fig. 11, for instance. This clamp consists of a T-piece, $x$, bearing on the carriage and having its screw-stem passing through a socket, $x'$, in the bed-plate, so that by turning the nut $y$ on the stem of the T-piece the carriage will be clamped to the bed-plate. The tables T T' may be adjusted to the different desired angles by the same means as described with reference to Fig. 6.

It will be seen that by the construction above described the model may be reproduced on a greater, smaller, or equal scale, and by adjusting the relative vertical movements of the tools out of proportion to their relative horizontal movements a model may be reproduced in grotesque.

I claim as my invention—

1. The combination of the pantograph-levers of a sculpturing, engraving, or modeling machine, and a guide-tool for the model to be copied, with a carving or modeling tool, and two pivoted levers connecting the two tools to transmit motion from one tool to the other in a direction at right angles to that transmitted by the pantograph-levers.

2. The combination of the pantograph-levers, a guide-tool spindle sliding vertically therein, with a carving-tool spindle also sliding vertically in the pantograph-levers, and the two pivoted levers pivoted to each other and one to each tool-spindle, all substantially as described.

3. The combination of the pantograph-levers and two tool-carrying spindles carried thereby, with connected levers pivoted to posts on the pantograph-levers, one or both adjustably, as and for the purpose set forth.

4. The combination of the tables adjustable to different angles with the horizontal pantograph-levers, vertically-sliding tool-carriers on the pantograph-levers, and levers connecting the two tool-carriers, whereby the vertical movement of one is transmitted to the other, as and for the purpose described.

5. The combination of the adjustable pantograph-levers and tool-spindles carried thereby, with levers connected to each other and to the tool-spindles and adjustably pivoted on the pantograph-levers, substantially as set forth.

6. The combination of the adjustable pantograph-levers and tool-spindles carried thereby, with levers connected to each other and to the tool-spindles and adjustably pivoted to the pantograph-levers, an adjustable carriage, and tables mounted thereon, all substantially as specified.

In testimony whereof I have signed my name to this specification in the presence of two subscribing witnesses.

JOHN G. CARLINET.

Witnesses:
WILLIAM D. CONNER,
JOHN E. PARKER.